United States Patent
Huang et al.

(10) Patent No.: US 6,368,645 B2
(45) Date of Patent: *Apr. 9, 2002

(54) REHEATING TOLERANT ICING COMPOSITION

(75) Inventors: Victor T. Huang, Moundsview; Fern A. Panda, New Brighton; Gerald O. Rabe, Minnetonka, all of MN (US)

(73) Assignee: The Pillsbury Company, Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,960

(22) Filed: Sep. 16, 1999

(51) Int. Cl.$^7$ .............................. H21P 13/00; A23G 3/00
(52) U.S. Cl. ..................... 426/94; 426/659; 426/243; 426/293; 426/296
(58) Field of Search ................................ 426/659, 243, 426/296, 293, 94

(56) References Cited

U.S. PATENT DOCUMENTS

| | | |
|---|---|---|
| 752,660 A | 2/1904 | Dillard |
| 1,371,450 A | 3/1921 | Speck et al. |
| 1,507,374 A | 9/1924 | Heinrich et al. |
| 1,551,175 A * | 8/1925 | Schneller |
| 1,606,778 A | 11/1926 | Yancey |
| 1,615,122 A | 1/1927 | Gordon |
| 1,737,620 A | 12/1929 | Talbot |
| 1,740,649 A | 12/1929 | Heyboer |
| 1,757,334 A | 5/1930 | Rankin |
| 2,029,448 A | 2/1936 | Totosian |
| 2,145,662 A * | 1/1939 | Miner et al. |
| 2,152,170 A | 3/1939 | Areiter |
| 2,171,244 A | 8/1939 | Otterbacher |
| 2,474,019 A | 6/1949 | Steiner et al. |
| 2,556,892 A | 6/1951 | Young |

(List continued on next page.)

FOREIGN PATENT DOCUMENTS

| | | |
|---|---|---|
| DE | 94 10 309.7 | 7/1994 |
| EP | 0 126 022 | 11/1984 |
| EP | 0 170 770 | 2/1986 |
| EP | 1 002 466 | 5/2000 |
| GB | 465242 | 5/1937 |
| GB | 2 321 213 | 7/1998 |
| JP | 58067159 | 4/1983 |
| WO | WO 88/04897 | 7/1988 |
| WO | WO 94/00996 | 1/1994 |
| WO | WO 98/30104 | 7/1998 |

OTHER PUBLICATIONS

"Freeze and Bake Stable Glazing for Confectionery Products"—European Food Research and Technology, vol. 210, 1999.

"Prevention Of The Growth Of Sucrose Hydrates In Sucrose Syrups", by, Young et al., Food Research, vol. 16, 1951, pp. 20–29.

*Primary Examiner*—Nina Bhat
(74) *Attorney, Agent, or Firm*—Kagan Binder, PLLC

(57) ABSTRACT

An improved icing includes at least about 10 percent by weight water, at least about 0.1 percent by weight gelling agent and at least about 5 percent by weight of a low solubility sugar, the low solubility sugar having a solubility in water of less than about 40 weight percent at 20° C. Improved icing compositions can be formed that have a cooling shear modulus of about 1000 Pa at a temperature less than about 37.8° C. and a melting shear modulus of about 5000 Pa at a temperature greater than about 73.9° C. The improved icing exhibits improved heat stability when the food product is reheated after freezing. The icing composition can be applied to a variety of food products including cakes and waffles. An improved waffle structure can be combined with the improved icing to form a toaster product.

34 Claims, 7 Drawing Sheets

U.S. PATENT DOCUMENTS

| | | | |
|---|---|---|---|
| 2,598,282 A | | 5/1952 | Melnick |
| 2,607,693 A | | 8/1952 | Latham et al. |
| 2,682,472 A | | 6/1954 | Wagner |
| 2,789,911 A | | 4/1957 | Toulmin, Jr. |
| 2,795,503 A | | 6/1957 | Dunshee et al. |
| 2,846,314 A | | 8/1958 | Aichele et al. |
| 2,914,410 A | | 11/1959 | Butler |
| 2,938,798 A | | 5/1960 | Toulmin |
| 2,963,373 A | | 12/1960 | Monti et al. |
| 2,970,918 A | | 2/1961 | Petersen |
| 3,253,928 A | | 5/1966 | Bedenk et al. |
| 3,256,804 A | | 6/1966 | Petrin |
| 3,266,907 A | | 8/1966 | Kozlik et al. |
| 3,332,784 A | | 7/1967 | Ellis |
| 3,464,830 A | | 9/1969 | Wabba |
| 3,503,345 A | | 3/1970 | Abrams |
| 3,532,513 A | | 10/1970 | Katz |
| 3,573,065 A | | 3/1971 | Arnesen |
| 3,592,663 A | | 7/1971 | Brunner et al. |
| 3,600,186 A | * | 8/1971 | Mattson et al. |
| 3,649,302 A | | 3/1972 | Daggey et al. |
| 3,656,971 A | | 4/1972 | Reimer |
| 3,676,155 A | | 7/1972 | Horn et al. |
| 3,767,830 A | | 10/1973 | Reimer |
| 3,784,713 A | | 1/1974 | Colten et al. |
| 3,784,714 A | | 1/1974 | McReynolds et al. |
| 3,803,333 A | | 4/1974 | Roudebush |
| 3,849,583 A | | 11/1974 | Aartsen |
| 3,862,341 A | | 1/1975 | Johannes |
| 3,875,309 A | | 4/1975 | Johannes |
| 3,917,874 A | | 11/1975 | Sands et al. |
| D237,935 S | | 12/1975 | Nygren |
| 3,955,008 A | | 5/1976 | Hanamoto |
| 3,961,980 A | | 6/1976 | Dunshee |
| 4,038,422 A | | 7/1977 | Keyser et al. |
| 4,135,005 A | | 1/1979 | Cheng |
| 4,140,804 A | | 2/1979 | Seymour |
| 4,146,652 A | | 3/1979 | Kahn et al. |
| 4,232,049 A | | 11/1980 | Blake |
| 4,379,176 A | | 4/1983 | Scherwitz et al. |
| 4,415,601 A | | 11/1983 | Eckel |
| 4,431,682 A | | 2/1984 | Smith et al. |
| 4,562,080 A | * | 12/1985 | Tenn |
| 4,645,674 A | | 2/1987 | Lang et al. |
| 4,661,366 A | | 4/1987 | Pinto et al. |
| 4,761,292 A | | 8/1988 | Augustine et al. |
| 5,028,442 A | | 7/1991 | Zemelman et al. |
| 5,037,000 A | | 8/1991 | Selame |
| 5,102,680 A | | 4/1992 | Glass |
| 5,108,769 A | | 4/1992 | Kincs |
| 5,154,115 A | | 10/1992 | Kian |
| 5,171,603 A | | 12/1992 | Singer et al. |
| 5,185,175 A | | 2/1993 | Loh et al. |
| 5,215,780 A | | 6/1993 | Meidenbauer |
| 5,230,918 A | | 7/1993 | Anderson et al. |
| 5,304,389 A | | 4/1994 | Kondo et al. |
| 5,439,697 A | * | 8/1995 | Gonzalez-Sanz |
| 5,508,054 A | | 4/1996 | Kretow et al. |
| 5,514,397 A | * | 5/1996 | Shapiro |
| 5,529,800 A | | 6/1996 | Bourns et al. |
| 5,567,467 A | * | 10/1996 | Kondou et al. |
| 5,571,547 A | | 11/1996 | Serpelloni |
| 5,571,555 A | | 11/1996 | Huang |
| 5,626,903 A | * | 5/1997 | Gautchier et al. |
| 5,631,034 A | | 5/1997 | Trumbetas |
| 5,709,896 A | | 1/1998 | Hartigan et al. |
| 5,948,170 A | * | 9/1999 | Yli-Kyyny et al. |
| 5,954,876 A | * | 9/1999 | Koch et al. |
| 5,968,583 A | | 10/1999 | Wesdorp |
| 5,976,586 A | | 11/1999 | Feller |

* cited by examiner

REHEATING TOLERANT ICING COMPOSITION

BACKGROUND OF THE INVENTION

The invention relates to icings for food products with improved processing characteristics. The improved icings are suitable for use on products during moderate amounts of reheating.

Food consumers are increasingly demanding high quality food products that are nevertheless convenient and simple to prepare. In particular, there is increasing consumer demand for high quality food products, such as breakfast foods, that require minimal amounts of preparation time. Thus, a variety of prepared foods are provided to consumers in a frozen form for consumption following thawing and/or reheating. Desired products include bakery products, such as cakes, sweet rolls, pastries, waffles, and the like, for consumption as breakfast foods, snack items or dessert products. These products preferably are stored and distributed without significantly diminishing the quality of the food item.

While freezing is a convenient method of storing high quality food items, products can undergo undesirable changes during frozen storage. Also, thawing of the product can lead to modifications of the product that are undesirable. Similarly, when examining the suitability of a frozen product for distribution to consumers, the possibility of the product undergoing one or more cycles of freezing and thawing should be considered as a possible outcome. Freeze-thaw cycles tend to promote significant changes in the consistency of food items.

In particular, frozen products, such as icings, with very high concentrations of sugar and a moderate moisture content can undergo undesirable changes upon frozen storage and/or upon thawing. For products with moist icings, undesirable changes in the appearance of the icing during frozen storage have been attributed to the formation of crystals of hydrated sucrose, which can form from a saturated aqueous sucrose solution. Icings with high sucrose concentrations can also attract moisture, which can collect on the surface of the icing. This moisture build-up is termed weeping.

SUMMARY OF THE INVENTION

In a first aspect, the invention pertains to an icing composition including at least about 10 percent by weight water, at least about 0.1 percent by weight gelling agent and at least about 5 percent by weight of a low solubility sugar, the low solubility sugar having a solubility in water of less than about 40 weight percent at 20° C. The icing composition can be applied to various food products such as a cake and a waffle.

In another aspect, the invention pertains to an icing composition including at least about 10 percent by weight sweetener and at least about 0.1 percent by weight gelling agent, the icing composition having a cooling shear modulus of about 1000 Pa at a temperature less than about 100° F. (37.8° C.) and a heating shear modulus of about 1000 Pa at a temperature greater than about 165° F. (73.9° C.), where the heating shear modulus is measured after at least about 12 hours at a temperature less than about 32° F.

In a further aspect, the invention pertains to a method of forming an iced food product, the method comprising:
  forming an icing by dispersing a gelling agent and dissolving a low solubility sweetener in heated water; and
  spreading the icing on a food product base.

Generally, iced food products suitable for toaster reheating can be prepared with the improved icings. Typically, the surface of the food product reaches about 200° F. to about 350° F. during a 1.0 to 3.0 minute toasting cycle. Moreover, the invention pertains to a method of preparing an iced food product for consumption, the method comprising heating the iced food product at an oven temperature from about 250° F. to about 350° F. for a time from about 5 minutes to about 40 minutes, wherein the icing does not substantially change appearance during the heating process.

DETAILED DESCRIPTION OF THE PREFERRED EMBODIMENTS

Figure 1:
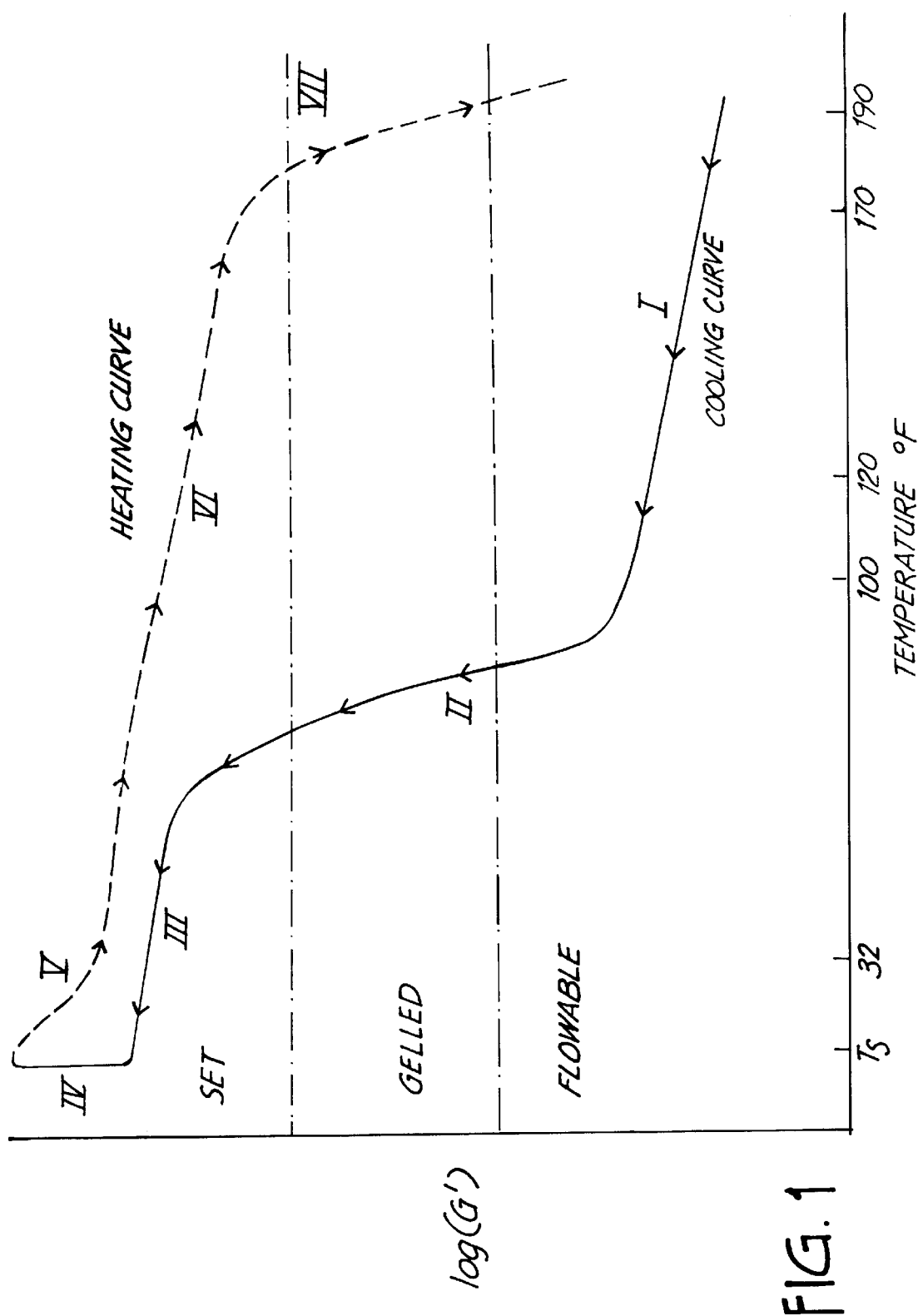
FIG. 1 is a representative plot of the shear modulus as a function of temperature for the cooling and heating of improved icings described herein.

Improved icings include sweeteners with a low solubility in water, which are substituted for a portion of the sucrose or other high solubility sweeteners typically found in icing compositions. The improved icings have improved storage stability. In particular, icings with these low solubility sweeteners do not form sucrose hydrate crystals on the surface of the frozen icing during storage and, when properly formulated, do not exhibit significant weeping or syneresis upon thawing. In preferred embodiments, the icings have improved processing characteristics including a relatively low gelling temperature, at which the icing is fixed in position, and a relatively high melting point following gelling. Due to the relatively high melting point, the icings have improved stability under moderate heating.

Icings for use on a variety of food products can be produced based on the disclosure herein. Generally, the icings have a significant water content such that the icings are moist. The moist icings described herein can be contrasted with hard, low moisture, heat stable icings. Hard, low moisture icings are used only on food products with very low water-activities of approximately 0.65 or less.

Preferred icings are "flat" in the sense that they are not significantly whipped or aerated. Flat icings are set and do not flow at room temperature. Aerated icings, in contrast, may flow with the application of even low amounts of pressure.

The icings generally are applied to a food product base for consumption as an iced food product.

In preferred embodiments, the icing compositions include a gelling agent as well as a thickener, which both contribute to improved processing features. In preferred embodiments, the low solubility sweetener works synergistically with the gelling agent and thickener to yield the improved characteristics described herein.

Traditional icings have a high concentration of sucrose. Upon freezing, crystals of sucrose hydrates can form on the surface of moist and flat icings. The crystals can have an appearance of blooms on the icing surface. The blooms have an undesirable appearance and can make the icing look moldy.

Furthermore, when a traditional moist and flat icing is thawed, sucrose, which has a high water solubility, results in an icing with a hygroscopic property that draws water into the icing from the atmosphere and the food product base under the icing. The hygroscopic property results in the icing becoming more fluid upon thawing of the food product and in weeping, the visible collection of liquid on the surface of the icing. While weeping can be reduced by using a food product base under the icing with a lower water activity, many food products, including many bakery products, have higher water activities that would lead to weeping of the icing.

It has been found that reduction of the sucrose content of the icing below a certain level alleviates these problems associated with traditional icings. The sucrose content is reduced to less than about 35% by weight. It has been found that replacing some of the sucrose with other high and low water solubility sweeteners improves the performance of the icing, particularly during freezing and subsequent thawing and/or reheating. The use of a combination of high and low solubility sweeteners is directed to reducing or eliminating sucrose hydrate formation, weeping/syneresis, and stickiness, while providing the desired level of sweetness and reheating tolerance. The high water solubility sweetener helps to inhibit sucrose hydrate formation, and provides the sweetness typically provided by sucrose. The addition of the low water solubility sweetener reduces the hygroscopic character of the icing such that weeping or syneresis is reduced or does not occur, reduces the stickiness of the icing during processing, and increases the melting temperature of the icing so that it can withstand reheating without losing its desired characteristics.

In preferred embodiments, the icings have improved processing characteristics. In particular, the preferred icings remain flowable at relatively low temperatures, i.e., temperatures as low as 100° F. Preferred icing application temperatures using these icings range from about 100°F. to 150° F. Thus, the icings are convenient to apply because they do not need to be kept at very high temperatures for application to the food product. Since the icings can be relatively cool when they are applied, there is more time to apply the icing while it gradually cools without needing to heat the icing.

Once the icings freeze and set for a period of time, preferred icings have a correspondingly high melting point, preferably greater than about 165° F. (73.9° C.). Therefore, the icings are very stable once they are frozen and set. The high melting properties of the preferred icings provide for the reheating of products to which they are applied at moderate temperatures without destroying the appearance of the icing. In particular, these improved icings can be applied conveniently to products intended to be reheated in a toaster.

Preferred toaster products for the application of the improved icings include, for example, waffles. An improved waffle is particularly suitable for the application of the improved icings such that the icings are not removed during the toasting process. The improved waffle has an inverse waffle pattern where the pattern of raised features and depressions is inverted to create a network of channels into which the icing can be easily applied. In particularly preferred embodiments of the waffles, the waffles include an extending edge that further acts to retain the icing on the waffle surface and prevent contact of the icing with the toaster components. Such contact would tend to transfer icing to the toaster components.

Icing Composition

The improved icings include water, a sweetener with low water solubility and a gelling agent. Preferred icings further include a sweetener with high water solubility. The icings generally are relatively moist. In particular, the icings generally have a water content from about 10 weight percent to about 40 weight percent, preferably from about 15 weight percent to about 35 weight percent and more preferably from about 20 weight percent to about 30 weight percent. The water can be added to the icing mixture directly or as a component of another ingredient composition, such as a corn syrup. The amount of water in the icing can be adjusted to produce an icing with approximately a desired value of water activity, by adjusting the relative amounts of water, sugars and other ingredients.

Preferred icings have two or more sweeteners, one with a high water solubility and one with low water solubility, which replace part of the sucrose content of a traditional icing formulation. Generally, the high water solubility sweeteners function as sucrose hydrate inhibitors, and the low water solubility sweeteners function as bulking agents, although each type of sweetener may have additional advantageous properties. Sweeteners with a high water solubility have a solubility in water of greater than about 40 weight percent at 20° C. In comparison, sweeteners with low water solubility have a solubility in water of less than about 35 weight percent at 20° C. Suitable high solubility sweeteners include non-sucrose sweeteners, for example, fructose, maltose, glucose, dextrose, trehalose, sweet polyols, such as maltitol, lactitol, sorbitol, xylitol, glycerol, corn syrups, starch hydrolysate products having a dextrose equivalent of 15 or higher, and mixtures thereof. Suitable corn syrups include high maltose corn syrup, high fructose corn syrup, hydrogenated corn syrup, and regular corn syrup. Suitable sweeteners with a low water solubility include, for example, lactose, isomalt, mannitol and erythritol.

As described previously, the low water solubility sweetener functions primarily as a bulking agent to replace some of the sucrose. In addition to providing bulk to the icing, the low water solubility sweetener also aids processing by reducing the stickiness of the icing. Furthermore, the low solubility sweetener, which preferably also has a high melting temperature, improves the reheatability of the icing and the iced product, and helps to keep the icing from melting or sliding off the iced product upon moderate reheating. Icings include a sweetener with low water solubility at a concentration from about 10 weight percent to about 60 weight percent, preferably from about 15 weight percent to about 50 weight percent, more preferably from about 20 weight percent to about 45 weight percent and even more preferably from about 20 weight percent to about 40 weight percent.

The non-sucrose high water solubility sweetener functions mainly as an inhibitor of sucrose hydrate formation and adds sweetness to the icing. In preferred embodiments, the icing includes a sweetener with a high water solubility at a concentration from about 1 weight percent to about 30 weight percent, more preferably from about 2 weight percent to about 25 weight percent and even more preferably from about 3 weight percent to about 20 weight percent. Some or all of the sweetener can be supplied in the form of a syrup, where the sweetener portion of the weight within the syrup is included in the evaluation of the amount of sweetener in the icing.

Maltose, which has a water solubility of about 40 weight percent at 20° C., functions primarily as a sucrose hydrate inhibitor in the icing, but can also provide some bulking properties similar to the low water solubility sweeteners in the icing composition.

In preferred embodiments, the high and low water solubility sweeteners, which are used to replace some of the sucrose in the icing composition, are present in an amount such that the sucrose to water ratio is reduced to less than about 1. This ratio significantly reduces or even eliminates the formation of sucrose hydrate crystals upon subjecting the icing to freezing temperatures. In addition to reducing sucrose hydrate formation, the combination of high and low water solubility sweeteners is preferably used to balance the desired attributes of sweetness, processability, and tolerance to reheating.

In preferred embodiments, the icing includes a gelling agent. The gelling agent assists with the formation of a solid icing with relatively high moisture levels. Suitable gelling agents form a gel in water at relatively low concentrations, typically less than about 5 weight percent. Preferred gelling agents form gels that have a relatively high melting point, greater than about 150° F. Agar is an example of a preferred gelling agent, since an agar gel has a melting point of about 200° F. Other suitable gelling agents include other polysaccharides, such as agarose, carageenan, and combinations thereof; gel-forming gums such as xanthan gum, locust bean gum, gellan gum, curdlan, calcium alginate, Konjac flour and combinations thereof; proteins, such as gelatin, albumin, globulin, prolamin, glutenin, and mixtures thereof; and other gel-forming agents that are suitable for use in food products.

Improved icings include gelling agents in amounts ranging from about 0.1 weight percent to about 3.0 weight percent and preferably from about 0.2 weight percent to about 2.0 weight percent and more preferably from about 0.3 weight percent to about 1.0 weight percent. Preferred gelling agents preferably have a melting point greater than about 165° F. (73.9° C.), preferably greater than about 175° F. (79.4° C.) and more preferably greater than about 185° F. (85.0° C.). In addition to the gel forming agent described above, the improved icings may contain a fat or a combination of fats having a high solid fat index to aid with gel formation.

In preferred heat stable embodiments, the icing further includes a thickener. Suitable thickeners include cellulose, food starches, modified food starches, gums and mixtures thereof. Suitable starches include pre-gelatinized starches that impart body and viscosity to the icing composition. Preferred starches include, for example, potato starch, modified pre-gelatinized tapioca and some corn starches. Preferred cellulose products are microfibrillated to provide increased swelling with water under high shear. In preferred heat stable icings, the icing includes from about 0.5 weight percent to about 15 weight percent, preferably from about 0.3 weight percent to about 10 weight percent and more preferably from about 0.1 weight percent to about 5 weight percent thickener.

The icings can include other optional ingredients. For example, the icings can include a fat ingredient. The fats can be high melting point fats (solid at room temperature), low melting point fats (liquid at room temperature) or mixtures thereof. Suitable high melting point fats include, for example, butter, cocoa butter, lard, hydrogenated and some partially hydrogenated vegetable oils and mixtures thereof. Suitable low melting point fats include, for example, vegetable oils, such as cotton seed oil, soybean oil, coconut oil, rapeseed oil, peanut oil, olive oil, palm oil, sunflower oil, and the like, and some partially hydrogenated vegetable oils. While fats are an optional ingredient in the icing, icings containing fat generally include from about 1 percent by weight fat to about 30 percent by weight fat, preferably 1.5 percent by weight fat to about 15 percent fat, and more preferably from about 2 percent by weight fat to about 10 percent by weight fat. Preferred icings for use on a waffle have a low fat content to reduce frying during heating in a toaster, and the fat or fats used, if any, preferably have high melting points.

The icings can include one or more flavorings to impart desired taste to the product. The flavorings generally are selected to complement the flavorings of the product on which the icing is applied. Any of a variety of natural or artificial flavorings can be used. Suitable flavorings include, for example, salt, vanilla, fruit flavors, chocolate, almond, peanut butter, hazelnut, pistachio, maple syrup, molasses, and the like. The flavorings are optional, but icings including flavoring generally include from about 0.1 weight percent to about 5 weight percent flavoring.

Also, the icings can include other ingredients, such as food color and/or emulsifiers. Natural and/or artificial food colors can be used. Suitable food colors include, for example, caramel coloring, titanium dioxide and the like. Commercial fats and shortenings can be preblended with emulsifiers. Preferably, the fats include less than about 2 percent by weight emulsifiers. Whether or not a fat with emulsifiers is added to the icing, additional emulsifier can be added, if desired. Suitable emulsifiers include, for example, egg yolk, egg white, gelatin, whey protein concentrate, mono or di-glycerides, polyoxyethylene sorbitan monostearate (60), polyoxyethylene sorbitan monooleate (80) and lecithin. The icing generally includes less than about 1 percent by weight emulsifier.

Properties of the Icing

The icings have a moderately high moisture content such that the icings are a relatively soft, set composition at room temperature. Preferred icings are flat, i.e., they are not significantly whipped or aerated. Flat icings or glazes generally are used to conform to the shape of the underlying food product.

Preferably, the icing has a relatively consistent appearance across its surface. The icing generally appears roughly white unless food coloring or colored flavorings are added. Colorings can be used to obtain any desired color. Unless particulate flavorings are added, the icing has a smooth surface.

As noted above, the amount of water in the icing can be adjusted to achieve a desired value of water activity. Water activity can be determined as $a_w = p/p_0 = ERH/100$, where p is the partial pressure of water above a sample, $p^0$ is the vapor pressure of pure water at the same temperature, ERH is the equilibrated relative humidity (%) surrounding the product. The improved icings with low water solubility sweeteners generally have water activities over reasonable ranges such that they are not hygroscopic.

The water activity of the icing preferably is close to the water activity of the underlying food product base or substrate. Then, the icing is less likely to exchange water with the substrate. Thus, if the water activity is adjusted to approximately the water activity of the substrate, the icing does not absorb appreciable amounts of water from either the air or from the substrate. The water activity of the substrate will depend on the nature of the substrate. For example, a moist cake generally has a water activity ranging from about 0.83 to about 0.9. An improved icing having a water activity of about 0.85 was found to be suitable for these types of cakes. Similarly, a waffle suitable for heating in a toaster generally has a water activity from about 0.85 to about 0.97. An improved icing having a water activity ranging from about 0.9 to about 0.92 was found to be suitable for these types of waffles.

Preferred icings are easy to apply because they do not set until relatively cool. The icings preferably also have a high melting point such that the icings can be reheated on the food product to moderate temperatures for moderate periods of time without melting. Since the icing can be applied to the product prior to distribution, the consumer does not have to apply the icing following reheating of the un-iced food product. These improved processing characteristics can be represented with a representative form of cooling and heating curves, as shown in FIG. 1. The curves depict the shear modulus as a function of temperature during the cooling process and the heating process. The Shear Modulus is measured with a dynamic stress rheometer with a parallel plate stand with a constant stress of 50 Pascals between the plates and a strain rate of 10 radians per second. A suitable rheometer is a Dynamic Stress Rheometer, Model SR500 from Rheometrics Scientific, Inc., Piscataway, N.J. In a preferred embodiment the gap setting is 1 mm and the plate diameter is 40 mm. The low gelling temperature and high melting temperature features of the icing result from a synergistic interaction of the various components of the icing.

As shown in FIG. 1, the icing during the cooling process first passes through an initial cooling region I where the icing increases gradually in shear modulus (G'). As cooling continues, a transition region II is reached preferably at a temperature less than about 100° F. (37.8° C.). During the transition region, the shear modulus increases much more sharply with decreasing temperature and undergoes a transition from a flowable state to a gelled state. In the gelled state, the icing may still be soft such that it can be deformed with the application of pressure. However, the gelled icing will start to crumble with the application of additional force as the transition between the gelled state and the set state is reached.

In the flowable state, the shear modulus of the icing is low enough that the icing flows as a result of gravity. In the gelled state, the icing is viscous so that it will not flow as a result of gravity, but the icing will flow with the application of high amounts of force. The icing can be applied to the food product substrate during the flowable state, but becomes more difficult to handle as the flowable state transitions to the gelled state and may require a higher level of force to be applied to the product as the temperature of the icing decreases to less than about 100° F.

The icing generally is applied to the food product in the flowable state prior to the transition region II. As the temperature is reduced further, the transition region II is passed and a set region III is reached where the shear modulus again increases relatively slowly as a function of lowering temperature.

As the temperature is lowered further a frozen storage temperature, $T_s$, is reached at which the icing is stored. The frozen storage temperature is less than about 20° F. and preferably less than about 10° F. During this storage period IV, the shear modulus continues to increase as the icing undergoes a transition to a more fully set state, possibly due to recrystallization of the sweeteners and the formation of ice crystals. Due to production and distribution considerations, most commercial products are stored at freezer temperatures for several weeks or months prior to consumption.

Once the set icing has been stored, the heating curve follows a different temperature dependent path than the cooling curve. As the icing is initially warmed, the icing undergoes an initial drop in shear modulus in region V. As the heating continues, the icing assumes a more gradual drop in shear modulus over an extended range of temperatures, marked as region VI in FIG. 1. The icing generally remains set during this gradual drop in shear modulus in region VI. As the temperature is increased further, a transition region VII is reached where the shear modulus drops more quickly as a function of temperature. The icing melts or softens into a flowable state (Shear modulus<=100 Pascals) during the transition region VII. In preferred embodiments, the melting or softening transition occurs at a temperature greater than about 140° F. (60.0° C.), preferably greater than about 150° F. (65.6° C.), and more preferably greater than about 160° F. (71.1° C.). Because of the high melting point of the icing, the icing can be heated along with the food product base without significantly damaging the appearance of the icing and having it flow from the food product base.

Forming the Icing

The icing is formed in a heated state such that the ingredients can be blended to form a smooth and uniform product. Generally, the water is initially heated and agitated. When agar is used as the gelling agent, the water temperature preferably is from about 170° F. to about 210° F. for the addition of the agar. The gelling agent is added to the heated and agitated water. The sucrose generally is added with the gelling agent, shortly after the gelling agent or partly with the gelling agent and partly after the gelling agent.

Figure 2:
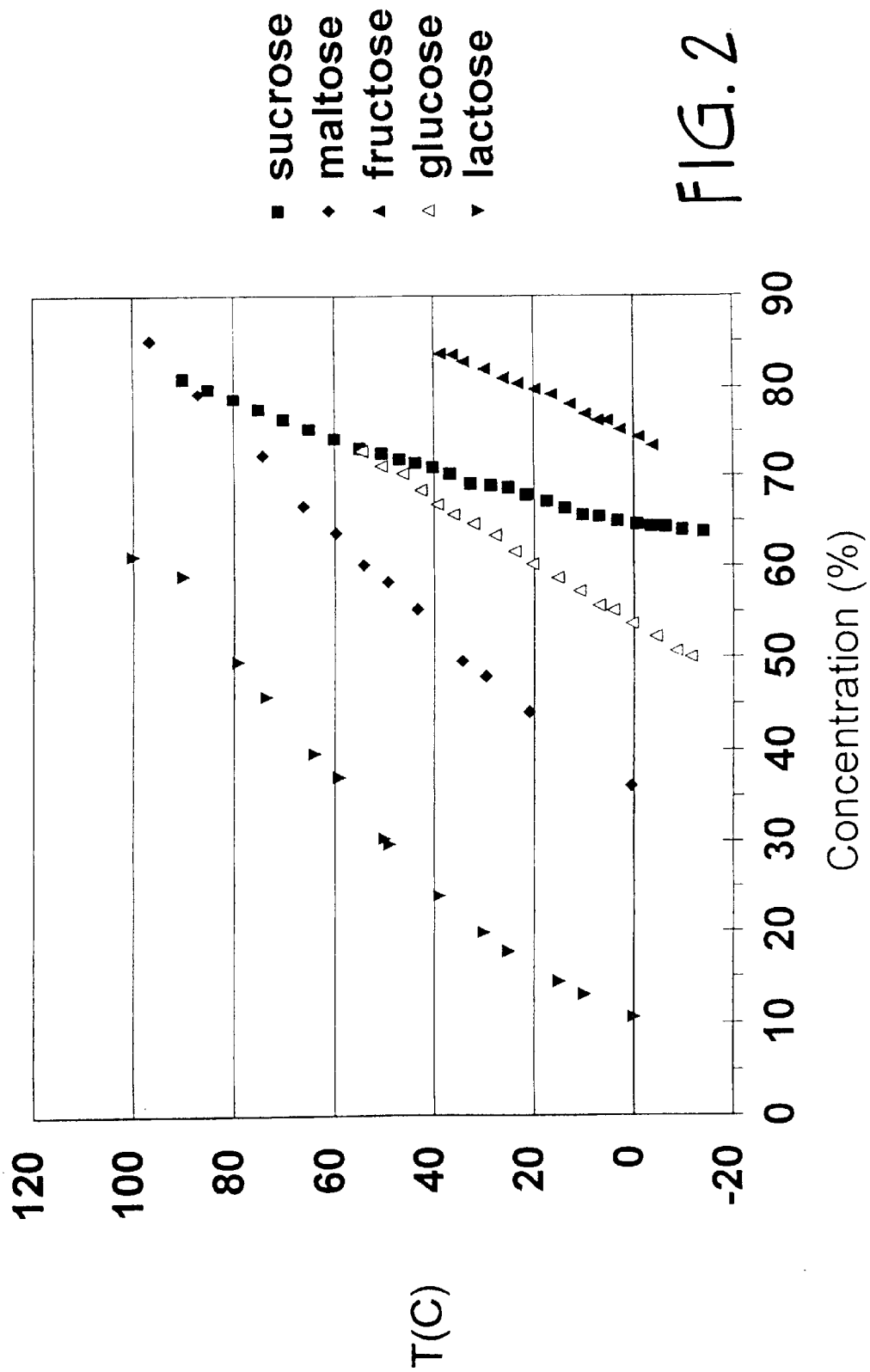
FIG. 2 is a plot of temperature as a function of solubility for five sugars.
Figure 3:
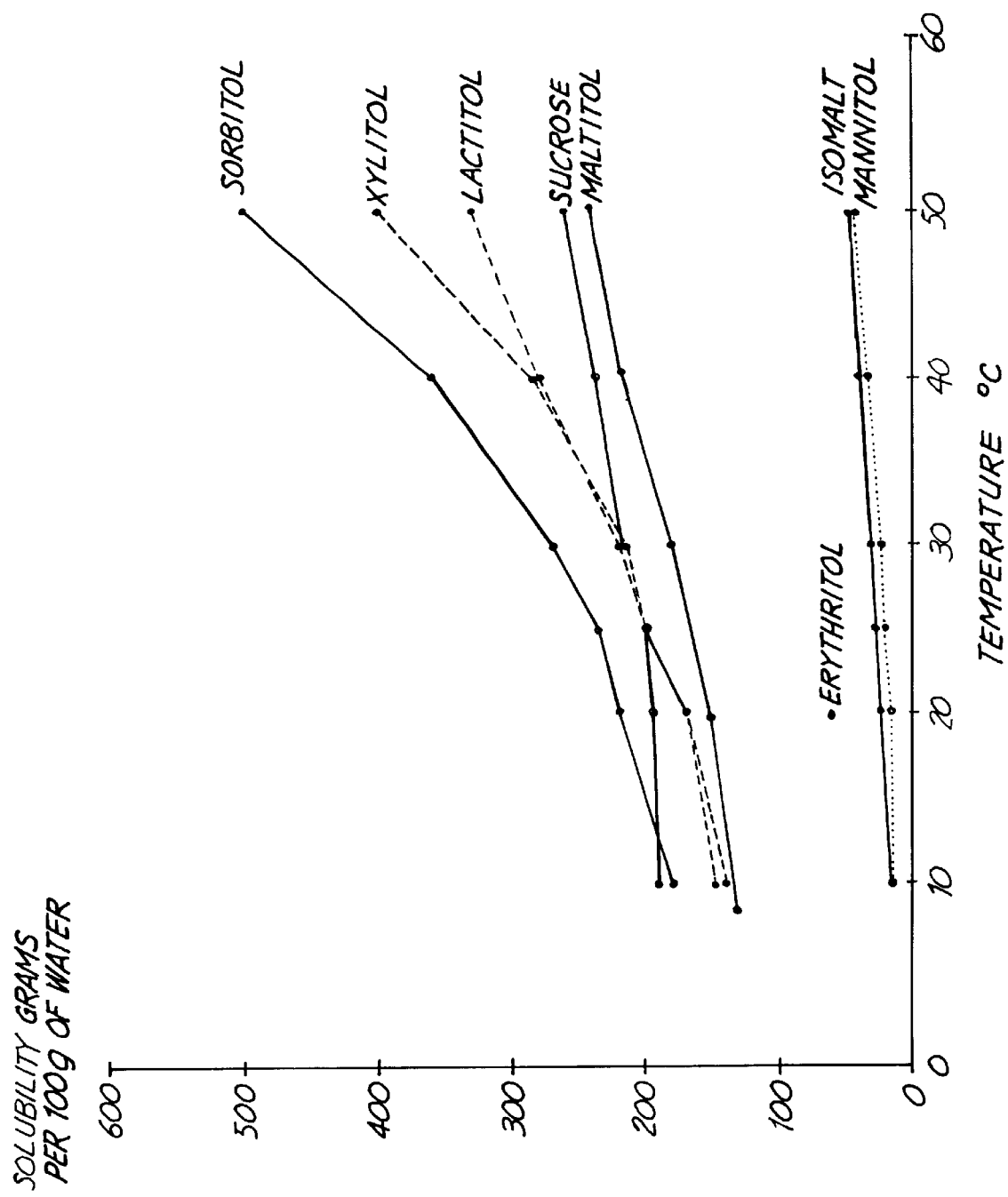
FIG. 3 is a plot of solubility as a function of temperature for sucrose and 7 alcohol sweeteners.

The additional sugars are added when the temperature of the mixture drops to 160° F. to about 175° F. The sweeteners are considerably more soluble at elevated temperatures. A plot of solubility as a function of temperature is shown in FIG. 2 for five different sugars and in FIG. 3 for six sweet alcohols and sucrose. Additional solid and or liquid ingredients are added at appropriate times to ensure proper blending.

Once all of the ingredients are adequately blended, the icing can be applied to the food product. Generally, the icing is cooled sufficiently that the icing does not run off of the product after it is applied. As described above, this range of shear modulus is indicated in FIG. 1 as the flowable phase. Appropriate values of shear modulus will depend to some extent on the method of application and the product. For example, drizzling the icing by gravity requires a lower value of shear modulus than pumping the icing onto the product or spreading the icing on the product. When applied to some products, the icing is not susceptible to running due to physical barriers on the food product. An improved waffle, described below, is such a product. For such products where running of the icing is not an issue, the icing can be applied at hotter temperatures (lower values of shear modulus), if desired.

The icing can be applied using any apparatus suitable for the application of the icing to the particular food product. In some preferred embodiments, the icing is applied to an improved toastable waffle product. The improved toastable waffle product and the application of icing to the improved waffle are described further below.

Uses and Application of the Icing

Although the icings can be distributed in a container for consumption or for later application to a food product base as a frosting, the icing is particularly suitable for the application to a food product for distribution as an iced or "frosted" food product, such as iced bakery products or iced toaster products. Flat icings are particularly suitable for application to cakes, muffins, breakfast items and pastries.

The improved icings described herein are particularly suitable for application to food products that are distributed to consumers in a frozen form. The icing is applied to the food base prior to freezing as the icing is cooled to a temperature where it has a suitable consistency to be spread onto the food product base without running off. After application of the icing, the iced food product preferably is frozen to prepare the iced food product for distribution as a frozen product. The frozen food product can be stored in frozen form for a reasonable period of time by the distributor, the retailer and/or the consumer.

Because of the improved characteristics of the icing, the iced food products can be heated to moderate temperatures without destroying the appearance of the icing. In particular, preferred icings have a melting point indicating a transition from a spreadable phase to a melted phase that is preferably higher than about 140° F. (60° C.), as noted above. Thus, starting from a frozen state, the frosted product can be thawed or heated in a toaster, an oven or the like at temperatures greater than ambient temperature for a sufficient amount of time to thaw and even warm an iced food product of reasonable size and density. Appropriate periods of thawing time will depend on the heating temperature and the type of product.

Due to the heat stability of the icings, they can be used as icings on toaster products. The toaster products generally are thin enough to fit within a standard toaster. Even if the icings are heat stable, the icings are sufficiently soft when heated that they can be partly removed upon contact with the interior parts of the toaster. Thus, in preferred embodiments the surface of the toaster product is textured such that the icing can be placed within recesses of the textured surface.

A waffle is an example of a food product with a textured surface, which has been adapted for toaster heating. In a conventional waffle, the surface of the waffle has isolated recesses. The icing can be placed within these recesses to provide some separation from toaster surfaces during the toasting process. While the icing can be placed within recesses of a conventional waffle, an improved waffle design described in the following section provides significant processing advantages for the application of icings.

Improved Waffle Structure

An improved surface structure can be used to produce an iced toaster product. In particular, the top surface of the improved food product has a reversed waffle texture. The bottom surface can also have a reversed waffle texture, or the bottom surface can have a different texture such as a flat texture or a traditional waffle texture. The toaster product can have any reasonable dough or batter consistency. In some preferred embodiments, the toaster product is a waffle product with a suitably altered surface configuration. Dough products with other consistencies can be surface textured to form a frozen toaster product.

The improved surface texturing is generally an inverse of the conventional waffle design. Specifically, the improved waffle design has isolated projections in place of isolated recesses. The recessed portion of the surface in the improved surface design forms a connected recessed network around the isolated projections. The icing can be more easily placed within the recess network than within isolated recesses. Preferred embodiments include raised edges to provide further confinement of the icing on the top surface of the food product.

Figure 4:
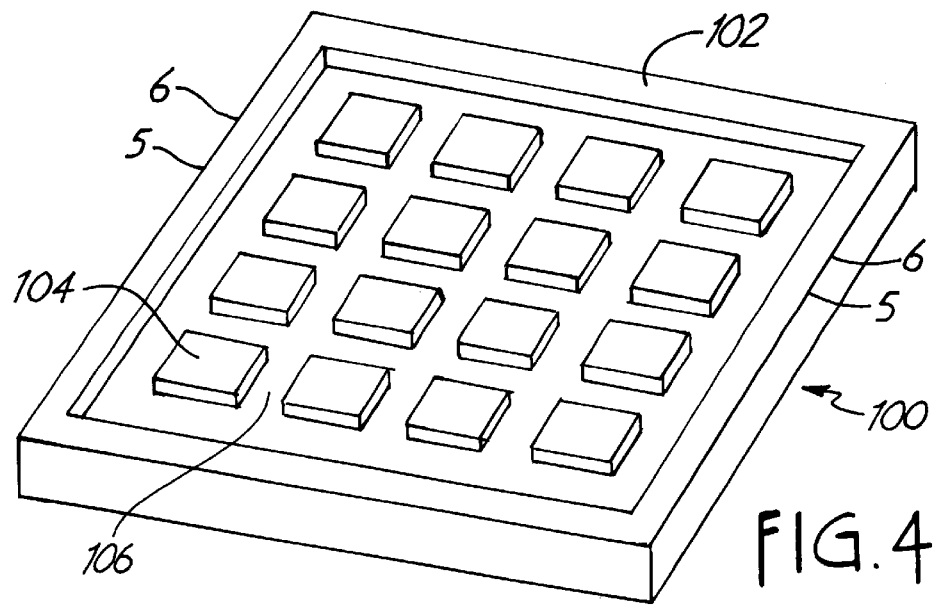
FIG. 4 is a schematic perspective view of an improved waffle design.

A particular embodiment of the improved toaster food product is shown in FIG. 4. The toaster surface of toaster food product 100 has projections 104 spaced along the surface. Channels 106 are located between projections 104 and are bounded by raised edges 102. Channels 106 form an interconnecting array spanning the surface between the raised edges. As displayed, projections 104 have a generally rectangular surface. The shape of the projections can be selected, as desired. For example, the surface of the projections can be circular or oval. Similarly, the shape of the waffle 100 itself can be varied, as desired.

The height of raised edges 102 relative to the floor of channels 106 may or may not be the same as the height of projections 104. For toaster products, raised edges 102 and protrusions 104 preferably have a height relative to the floor of the channels between about 2 mm and about 12 mm, preferably between about 3 mm and 10 mm and more preferably between about 4 mm and 9 mm. The cross sectional area and number of protrusions can be varied within any reasonable values. Generally, though, there are at least four protrusions 104 to form a network of intersecting channels 106 in the area between raised edges 102. In preferred embodiments, protrusions 104 are rectangular and organized in an array of rows leading to approximately straight intersecting channels 106 such that the icing is applied in straight lines.

Figure 5:
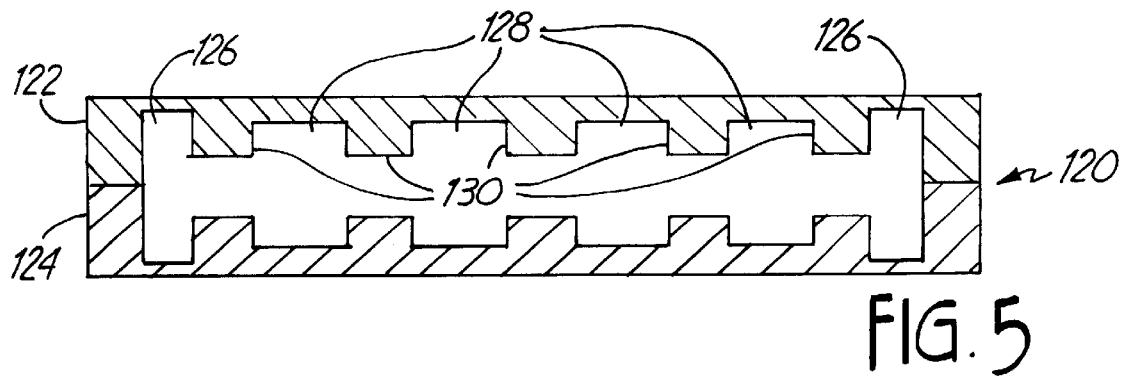
FIG. 5 is a sectional view of a waffle iron suitable for forming the waffle of FIG. 4 taken along a point in the waffle iron corresponding to the part of the waffle marked 5—5 in FIG. 4.
Figure 6:
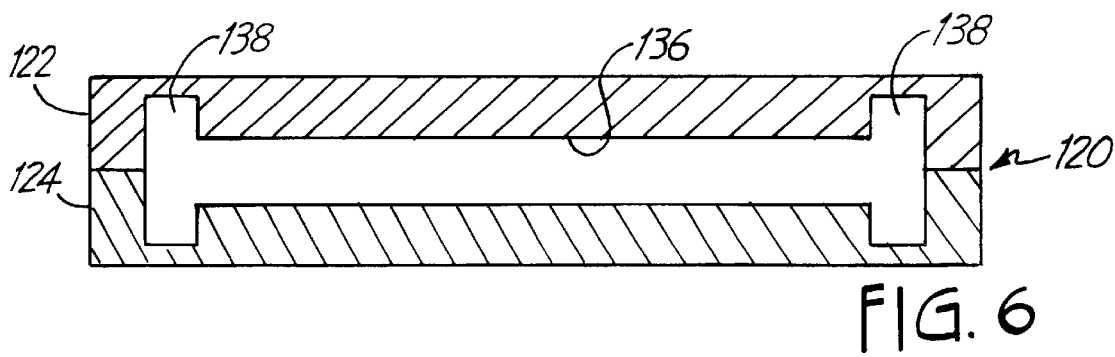
FIG. 6 is a sectional view of a waffle iron suitable for forming the waffle of FIG. 4 taken along a point in the waffle iron corresponding to the part of the waffle marked 6—6 in FIG. 4.

Generally, waffle 100 is produced with a waffle iron, which has a die with a surface structure in the inverse of the surface structure of the toaster food product. Cross sections of a suitable waffle iron 120 are shown in FIGS. 5 and 6. Referring to FIG. 5, the cross section is taken through waffle iron 120 at a point corresponding on the waffle to the line marked 5—5 in FIG. 4. Waffle iron 120 has a top section 122 and a bottom section 124. Top section 122 includes two notches 126 for the formation of raised edge 102 and four inner notches 128 for the formation of protrusions 104. Projections 130 correspond to channels 106 within waffle 100. As depicted in FIG. 5, raised edges 102 has a higher height relative to channels 106 than protrusions 104.

Lower section 124 is depicted with structure matching upper section 122. If desired, lower section 124 can have different structure from upper section 122. For example, lower section 124 can be flat, or lower section 124 can have a traditional waffle structure.

Referring to FIG. 6, the cross section is taken along the portion of the waffle iron corresponding to line 6—6 in FIG. 4 along a channel of waffle 100. Because the cross section is taken along the channel, upper section 122 has an extended flat portion 136 corresponding to channel 106 along line 6—6. Upper section 122 has notches 138 corresponding to the raised edges 102. Bottom section 124 is depicted in FIG. 6 with the corresponding structure as upper section 122. As noted above, bottom section 124 can have a different structure from upper section 122, if desired.

In preferred embodiments, icing is placed within the interconnecting network of channels 106 on the top surface of the toaster food product. The deposition of the icing is more easily accomplished if the channels are roughly straight. If the icing is placed within the channels, the protrusions and the raised edges shield the icing from the toaster surfaces. In addition, if a portion of the icing is melted due to localized heating the protrusions and edges provide a barrier to the flow of icing off of the toaster food product. Placement of the icing within the channels can be accomplished quickly with the use of a conventional spot depositor. The icing is kept warm at a suitable temperature for application.

EXAMPLES

Waffle Icing

A first icing was prepared that was suitable for use on a waffle suitable for reheating in a toaster. The properties of the icing were examined.

To prepare the icing, water was heated to about 175° F. (79.4° C.). The agar and some of the sugar were preblended, and then added to the heated water while agitating the mixture at 800 rpm. The temperature was increased to about 200° F. (93.30° C.), after which the corn syrup and the shortening were added. Then, the remaining sucrose, flavorings, emulsifiers, cellulose and lactose were added and blended until the icing was smooth. The resulting icing ingredients in weight percent are summarized in the first column of Table 1.

TABLE 1

|  | 1 | 2 | 3 |
| --- | --- | --- | --- |
| Water | 31.15 | 17.00 | 13.00 |
| Agar | 0.70 | 0.65 | 0.40 |
| Sucrose | 23.28 | 19.50 | 72.74 |
| Corn Syrup | 3.00[1] | 14.75[2] | 9.00[3] |
| $TiO_2$ | 0.00 | 0.08 | 0.06 |
| Flavoring | 0.83 | 0.30 | 0.00 |
| Salt | 0.10 | 0.10 | 0.10 |
| Waxy Starch | 0.00 | 0.00 | 0.20 |
| Shortening | 4.00 | 4.50 | 4.50 |
| Cellulose | 5.00[4] | 0.45[5] | 0.00 |
| Lactose | 31.30 | 42.47 | 0.00 |
| Emulsifier | 0.64[6] | 0.20 | 0.00 |
| Total | 100.00 | 100.00 | 100.00 |
| % water (w/o lactose) | 31.72 | 21.28 | 14.71 |
| % sucrose | 22.88 | 19.50 | 72.74 |
| Aw | 0.92 | 0.84 | 0.81 |

Figure 7:
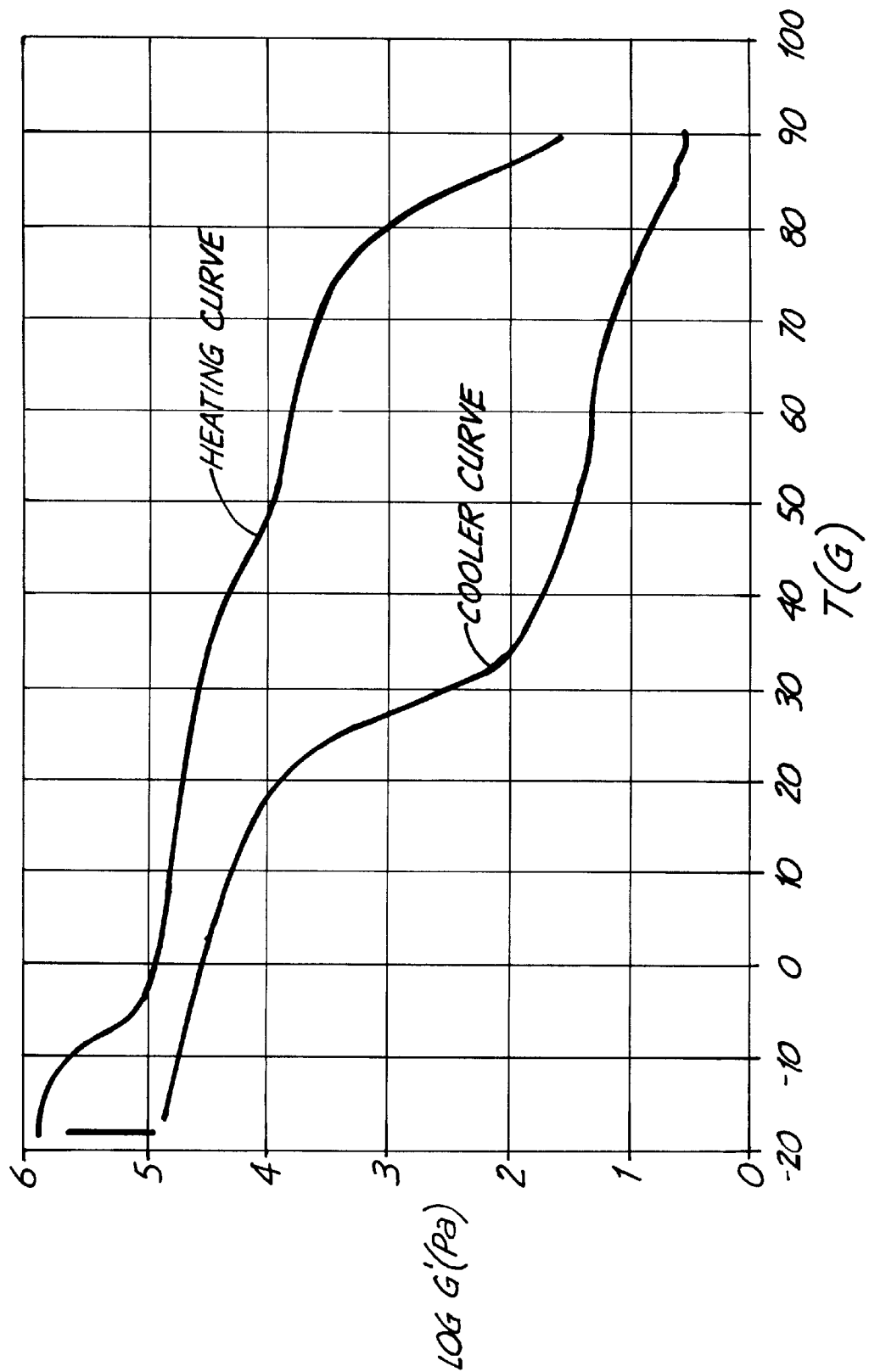
FIG. 7 is a plot of cooling and heating curves indicating shear modulus as a function of temperature for a waffle icing.

[1] 65% high maltose corn syrup
[2] high fructose corn syrup
[3] 64 DE corn syrup (DE = dextrose equivalent value)
[4] 2% FCC Solka Floc™ cellulose powder from Fiber Sales & Development Corp., St. Louis, Missouri
[5] Ultracel™ 6x cotton seed fiber powder from Watson Foods, Inc., West Haven, Connecticut
[6] 0.60% whey protein concentrate and 0.04% lecithin The shear modulus as a function of temperature along the cooling and heating curves is plotted in FIG. 7 for the waffle icing. Shear modulus was measured with a Rheometrics Dynamic Stress Rheometer, Model SR 500 made by Rheometrics Scientific, Inc., Piscataway, N.J. The Rheometer had a parallel plate stand with a gap setting of 1 mm and a diameter of 40 mm. Hot icing was placed on the stand at 90° C. and cooled to −18° C. at a rate of 5° C. per minute. The icing was held at −18° C. for 16 hours. Then, the icing was heated at a rate of 5° C. per minute to 90° C. The plate was kept at a constant stress of 50 Pascals (Pa). The shear modulus was obtained with a strain rate of 10 radians per second. The shear modulus curves have a characteristic shape similar to that shown in FIG. 1.

Figure 8:
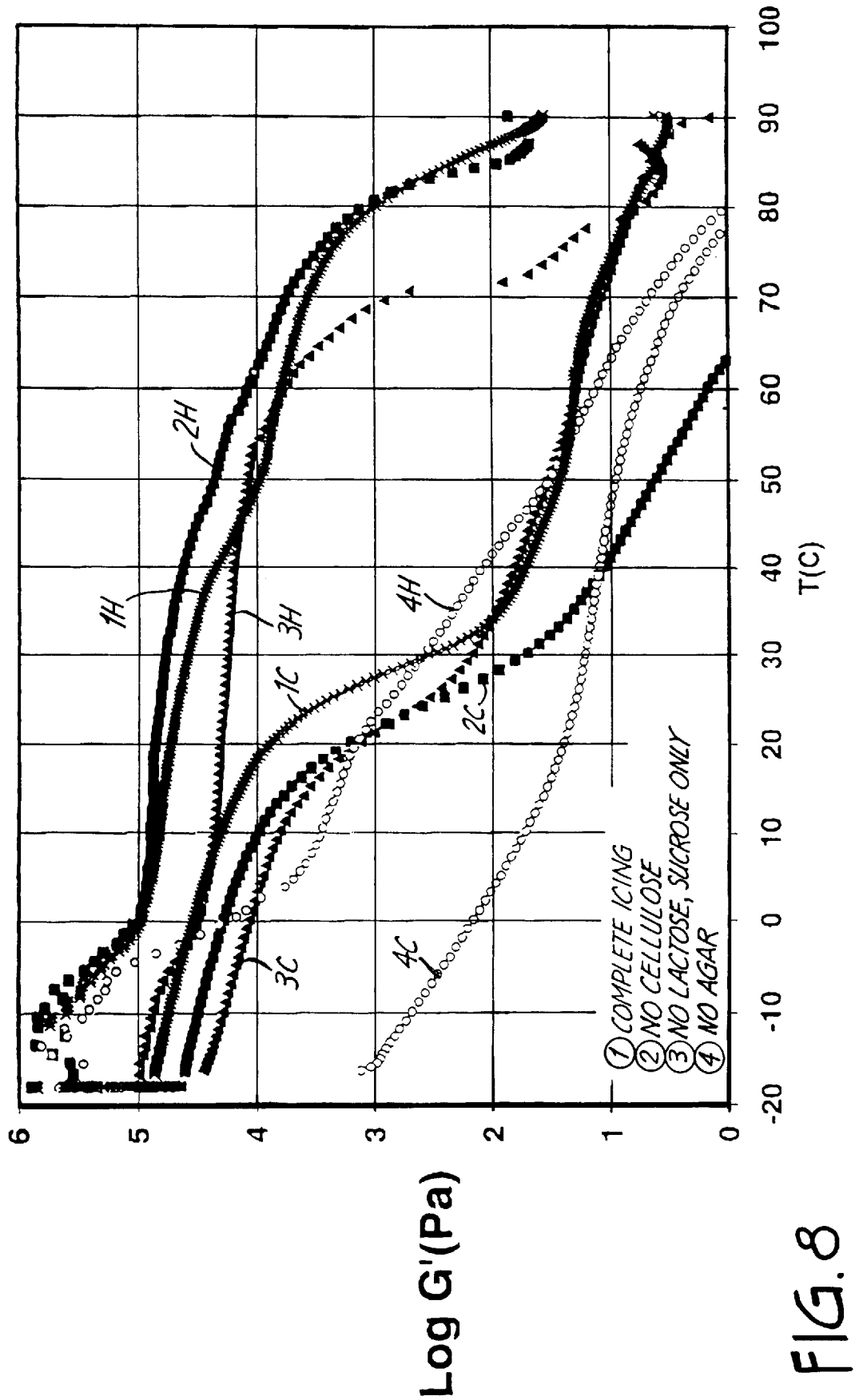
FIG. 8 is a plot of the shear modulus as a function of temperature along cooling and heating curves for a waffle icing and three variations in the icing formula.

To evaluate the effect of various components on the shear, three comparable icings were prepared with components left out of the formulation. The resulting cooling and heating curves are presented in FIG. 8. The cooling curves are designated with an "S" and the heating curves are designated with an "M". Curves marked with a "1" included all of the ingredients while curves marked 2, 3 or 4 were lacking cellulose, lactose or agar, respectively. The samples lacking lactose included additional sucrose such that the total weight percent sugar was the same. The samples lacking cellulose had a significantly lower shear modulus at higher temperatures during the cooling process but had very similar melting properties. The sample lacking lactose set at a somewhat lower temperature and melted at a significantly lower temperature. The samples without agar had very different cooling and melting properties.

Figure 9:
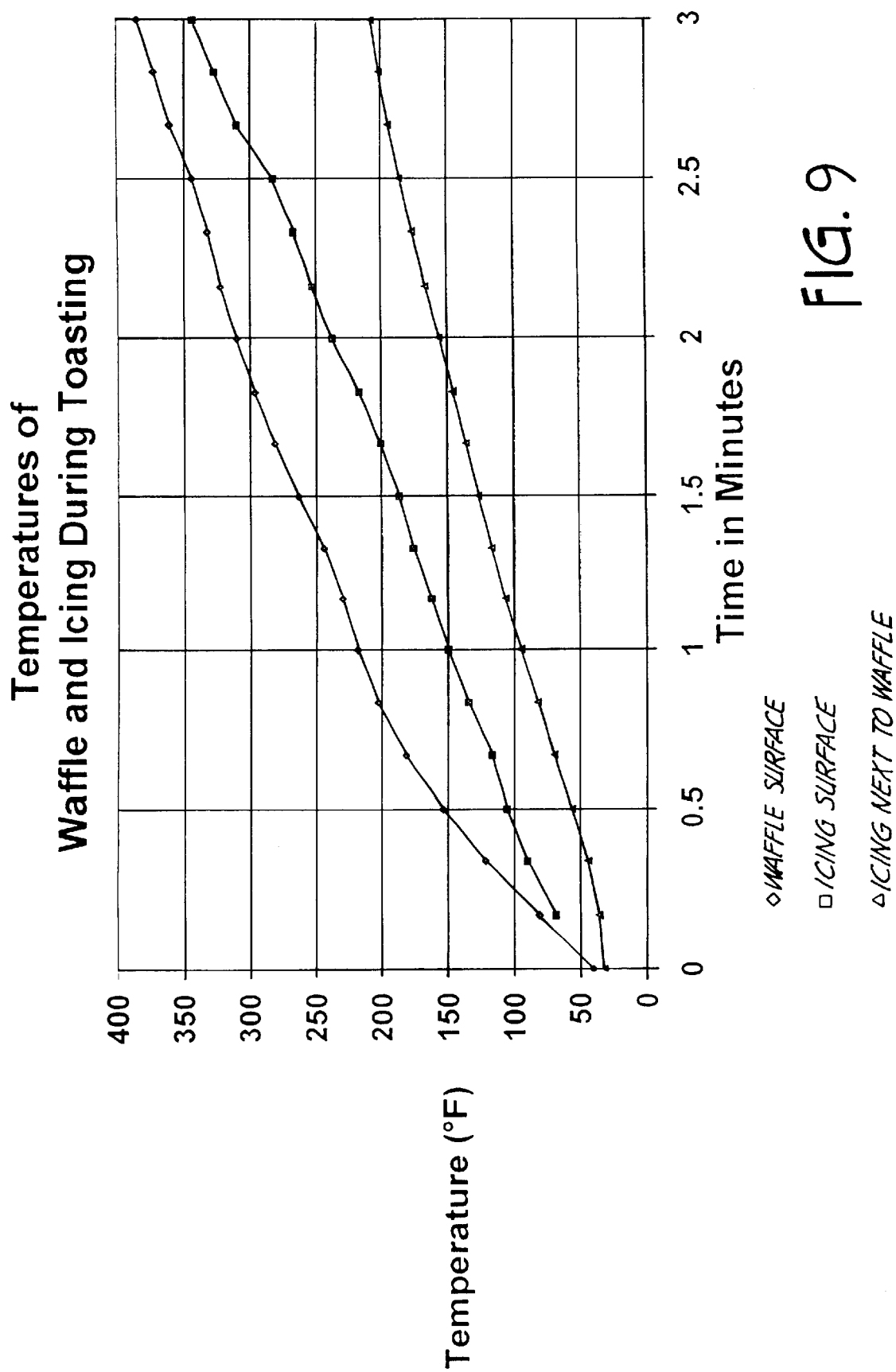
FIG. 9 is a plot of waffle and icing temperatures as a function of time in a toaster.

To test the suitability of the icing on a toaster product, the icing was placed on a waffle with the improved surface design as shown in FIG. 4. The icing was placed within the channels along the surface. The icing was deposited at temperatures ranging from 130° F. to 160° F. The waffle had a traditional waffle formula with a water activity of about 0.95. The temperature of the waffle surface, the icing surface and icing next to the waffle are plotted in FIG. 9 as a function of time heated within a standard toaster. The icing begins to run off when the icing reaches a temperature from about 195°–200° F. (90.5°–93.3° C.). Thus, the icing remains intact under standard toasting conditions.

Cake Icing

This example demonstrates the heat stability of an improved icing formulated for use on a cake. These improved icings are compared with a traditional icing.

The ingredients in the improved icing are summarized in the second column of Table 1. The ingredients of the improved icing are selected to match approximately the water activity of the cake. For comparison, a traditional icing was prepared. The formula of the traditional icing is given in the third column of Table 1. The icing was formulated essentially as described for the waffle icing in Example 1.

Icing was placed on two cakes at a temperature between about 140–155° F. (60–68.3° C.). The icing was applied from a warming trough. The icing drains from the trough into a pipe flowing into a pump. The pump directs the icing into a tube with small holes. The icing flows out of these small holes onto the cake. One cake was iced with conventional icing (formula of column 3 of Table 1) and a similar cake was iced with a low sucrose icing (formula of column 2 of Table 1). The two cakes were frozen at −17.7° C. After 30 days, the cake with conventional icing had sucrose hydrate crystals, and sections where sucrose hydrate crystals had not formed were wet due to weeping and syneresis. The cake with the low sucrose icing did not have any visible sucrose hydrate crystals or weeping, even after 90 days of frozen storage at 0° F. (−17.7° C.).

The two cakes were then thawed at room temperature (22° C.) overnight. The conventional icing was wet and watery where sucrose hydrate crystals existed and was still wet on the parts of the icing where these was weeping and syneresis. Note that sucrose hydrates melt at room temperature. The icing using the low sucrose formula was very dry and not sticky. To illustrate how the icings react to reheating, both thawed cakes were placed into an oven at 350° F. and heated for 20 minutes. The conventional, high sucrose, icing dried out and exhibited boiling and browning. The low sucrose icing tolerated the heat much better and was still moist and glossy after baking.

Although the present invention has been described with reference to preferred embodiments, workers skilled in the art will recognize that changes may be made in form and detail without departing from the spirit and scope of the invention.

What is claimed is:

1. A reheating tolerant icing composition at least about 20 percent by weight water, at least about 0.1 percent by weight gelling agent, from 1 percent by weight to about 30 percent by weight of a high solubility sugar and at least about 5 percent by weight of a low solubility sugar, the low solubility sugar having a solubility in water of less than about 40 weight percent at 20° C., wherein said composition contains no more than about 35% sucrose.

2. The icing composition of claim 1 comprising at least about 0.2 percent by weight gelling agent.

3. The icing composition of claim 1 comprising from about 0.3 percent by weight to about 1.0 weight percent gelling agent.

4. The icing composition of claim 1 wherein the gelling agent comprises agar.

5. The icing composition of claim 1 comprising at least about 15 weight percent low solubility sweetener.

6. The icing composition of claim 1 comprising from about 20 weight percent to about 45 percent by weight low solubility sweetener.

7. The icing composition of claim 1 wherein the low solubility sugar is selected from the group consisting of lactose, isomalt, mannitol and erythritol.

8. The icing composition of claim 1 comprising from about 1 percent by weight to about 30 percent by weight high solubility sweetener.

9. The icing composition of claim 1 comprising from about 1 percent by weight to about fat to about 30 weight percent fat.

10. A bakery product having a frosting comprising the icing of claim 1.

11. A toaster product comprising icing of claim 1.

12. The icing and toaster product combination waffle of claim 11 wherein the toaster product is a waffle and the icing is located in interconnecting channels within an area surrounded by raised edges.

13. The icing composition of claim 1, wherein the high solubility sugar comprises a sugar other than sucrose.

14. A food product comprising a top surface texture with a pattern of intersecting channels spanning an area between raised edges, the food product comprising the reheating tolerant icing of claim 1, wherein said icing is located in said intersecting channels.

15. The food product of claim 14, comprising a plurality of projections are organized into rows along said top surface, said icing being located between said plurality of projections.

16. The food product of claim 15, wherein the rows are generally straight.

17. The food product of claim 15, wherein the projections have a height above the floor of the channels from about 1 mm to about 10 mm.

18. The food product of claim 15, wherein the raised edges have a height above the floor of the channels from about 1 mm to about 10 mm.

19. The food product of claim 15, having a textured lower surface with a pattern of intersecting channels spanning an area between raised edges.

20. The food product of claim 15, having a flat lower surface.

21. The icing composition of claim 1, comprising at least about 20 percent by weight of a low solubility sugar.

22. The icing composition of claim 21 wherein the icing composition has a heating shear modulus of about 1000 Pa at a temperature greater than about 175° F. (79.40° C.).

23. The icing composition of claim 21 wherein the icing composition has a heating shear modulus of about 1000 Pa at a temperature greater than about 185° F. (85° C.).

24. The icing composition of claim 21 wherein the gelling agent is selected from the group consisting of polysaccharides and polysaccharide blends, proteins, and mixtures thereof.

25. The icing composition of claim 21 wherein the gelling agent is selected from the group consisting of agar, agarose, xanthan gum, carrageenan, gelatin and locust bean gum.

26. The icing composition of claim 21, further comprising a high solubility sugar other than sucrose.

27. A method of making a reheating tolerant iced food product, the method comprising:

forming an icing by dispersing at least about 0.1 percent by weight of a gelling agent, from 1 percent by weight to about 30 percent by weight of a high solubility sweetener and at least about 5 percent by weight of a low solubility sweetener in heated water; and spreading the icing while having at least about 20 percent by weight water on a food product base wherein said icing contains no more than about 35% sucrose.

28. The method of claim 27 wherein the icing has at least about 0.15 weight percent low solubility sweetener.

29. The method of claim 27 wherein the icing has at least about 0.2 percent by weight gelling agent.

30. The method of claim 27 wherein the food product base comprises a bakery product.

31. The method of claim 27 wherein the food product base comprises a toaster product.

32. A reheating tolerant icing composition comprising an amount of sucrose, at least about 10 percent by weight water, at least about 0.1 percent by weight gelling agent and at least about 10 percent by weight of a low solubility sugar, the low solubility sugar having a solubility in water of less than about 40 weight percent at 20° C., and the sucrose to water ratio being less than about 1.0, wherein said composition contains no more than about 35% sucrose.

33. The icing composition of claim 32, further comprising an amount of a high solubility sugar other than sucrose.

34. The icing composition of claim 33, wherein the other high solubility sugar is present at from about 1.0 percent by weight to about 30 percent by weight.

* * * * *